United States Patent [19]

Hellinger et al.

[11] 4,366,596
[45] Jan. 4, 1983

[54] REMOVABLE COVERS FOR CLOSED LOOP UTENSIL HANDLES

[75] Inventors: David L. Hellinger; Gordon D. Bell, both of Fort Wayne; Gregory N. Brown, Lafayette; Robert J. Kennedy, Jr.; Kendall S. Smith, II, both of W. Lafayette, all of Ind.

[73] Assignee: Lincoln Manufacturing Company, Inc., Fort Wayne, Ind.

[21] Appl. No.: 199,575

[22] Filed: Oct. 22, 1980

[51] Int. Cl.³ .................. A47J 45/08; A47J 45/10
[52] U.S. Cl. ..................................... 16/119; 38/95
[58] Field of Search ............... 16/119, 125, DIG. 12; 38/95, 90

[56] References Cited

U.S. PATENT DOCUMENTS

| | | |
|---|---|---|
| 463,335 | 11/1891 | Mulford . |
| 701,305 | 6/1902 | Daughtry . |
| 2,274,605 | 2/1942 | Hoffmeister . |
| 2,425,245 | 8/1947 | Johnson . |
| 2,543,832 | 3/1951 | Calvert . |
| 2,613,460 | 10/1952 | Vance ............................ 38/90 X |
| 3,912,140 | 10/1975 | Franges ....................... 16/110 R X |

FOREIGN PATENT DOCUMENTS

| | | | |
|---|---|---|---|
| 23129 | 5/1930 | Australia ............................ 16/119 |
| 105900 | 8/1924 | Switzerland ....................... 16/119 |
| 413790 | 7/1934 | United Kingdom ......... 16/DIG. 12 |
| 433607 | 8/1935 | United Kingdom ................... 38/95 |

*Primary Examiner*—Andrew V. Kundrat
*Attorney, Agent, or Firm*—Albert L. Jeffers; John F. Hoffman

[57] ABSTRACT

A one piece heat insulating cover for a closed loop cooking utensil handle is disclosed having a body of resilient rubber-like material with low thermal conductivity with a hand grip portion for substantially surrounding the utensil handle and a protective portion which lies adjacent a portion of the utensil main body between the utensil handle and the main body when the hand grip portion is in position about the utensil handle so that the protective portion provides a barrier to prevent a user's hand from contacting the utensil body when grasping the hand grip portion. The hand grip portion is formed as a generally U-shaped hollow tubular member with the protective portion extending between the ends of the U and with the hollow tubular member being slit along an edge thereof between the ends of the U to facilitate placement and removal of the tubular member about the handle. This slit may be joined by a rib and groove fastening arrangement to maintain the slit closed when the grip is in position on a utensil handle.

10 Claims, 13 Drawing Figures

U.S. Patent   Jan. 4, 1983   Sheet 1 of 3   4,366,596
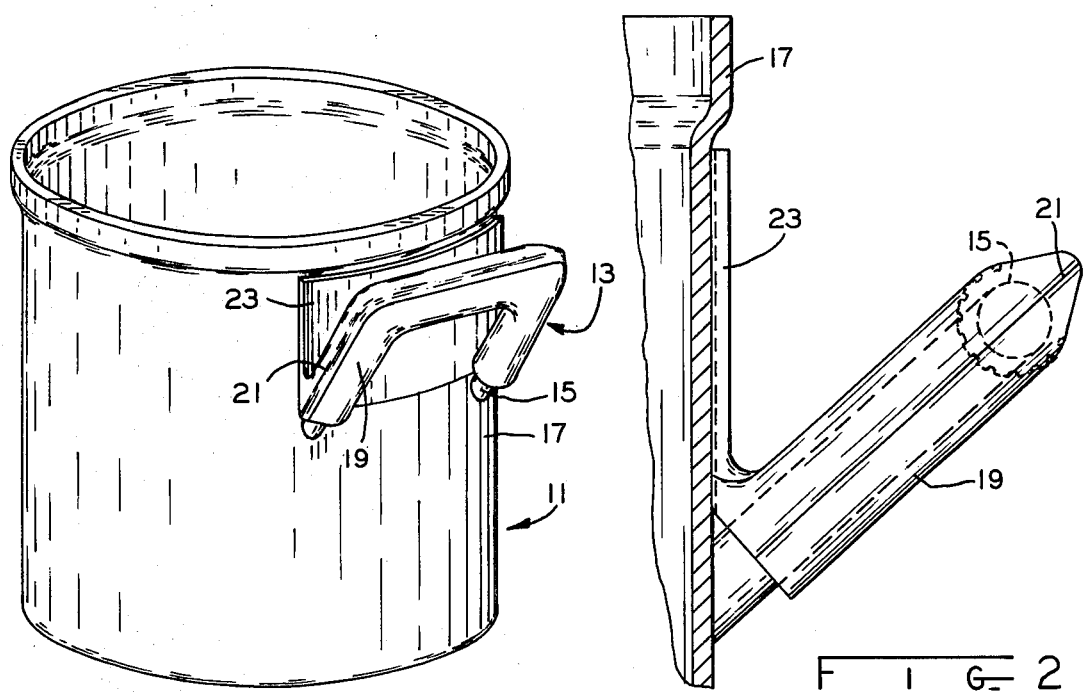
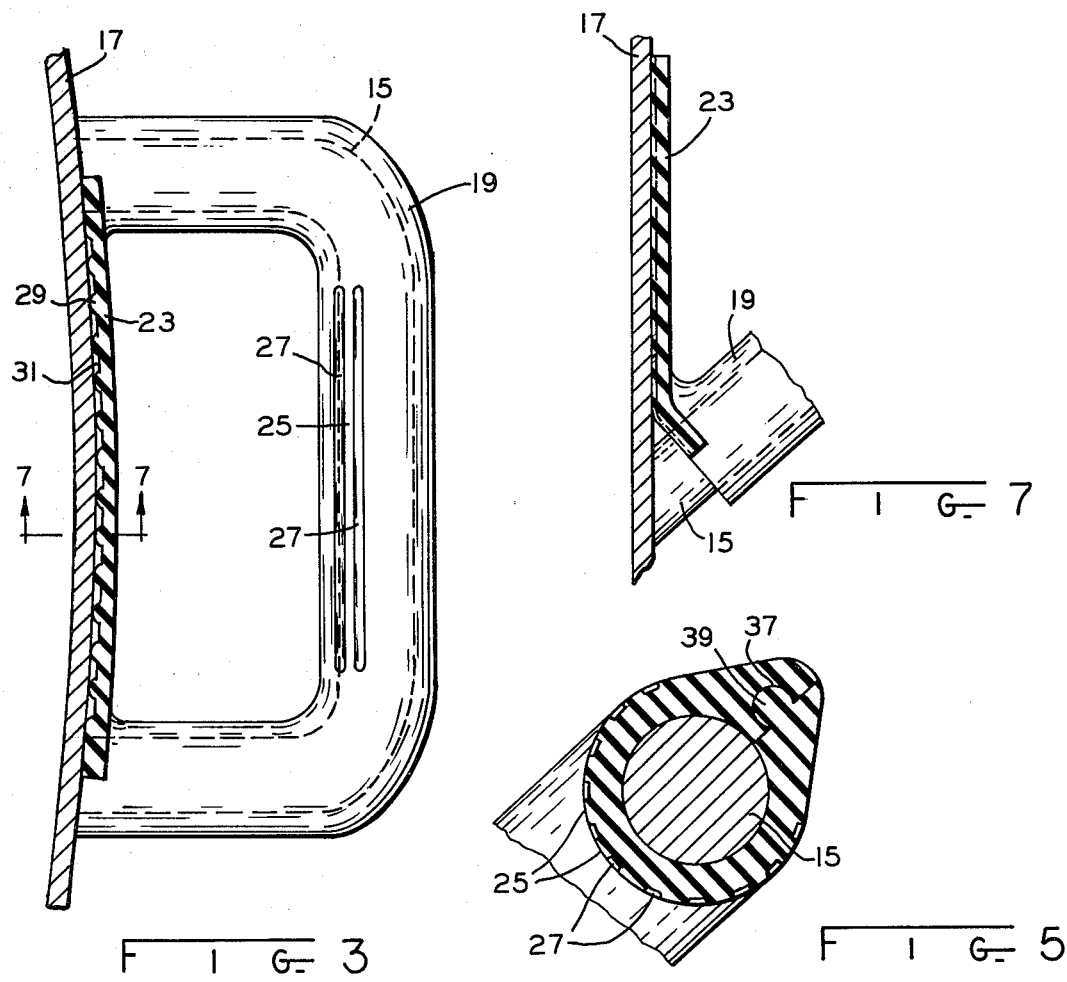

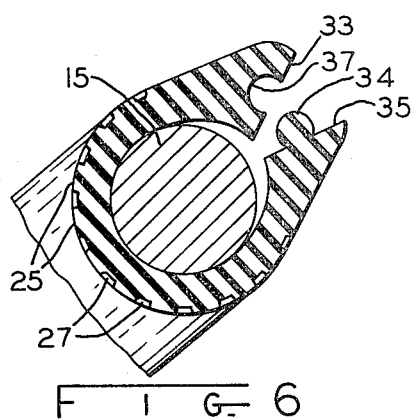
FIG. 6
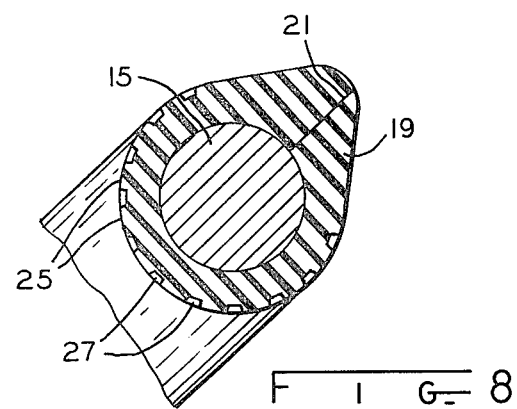
FIG. 8
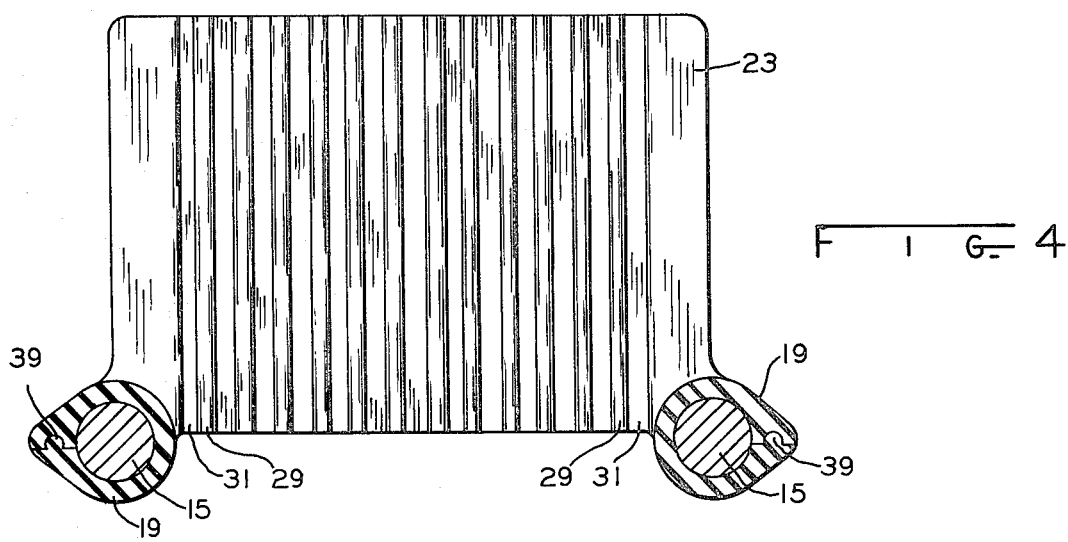
FIG. 4
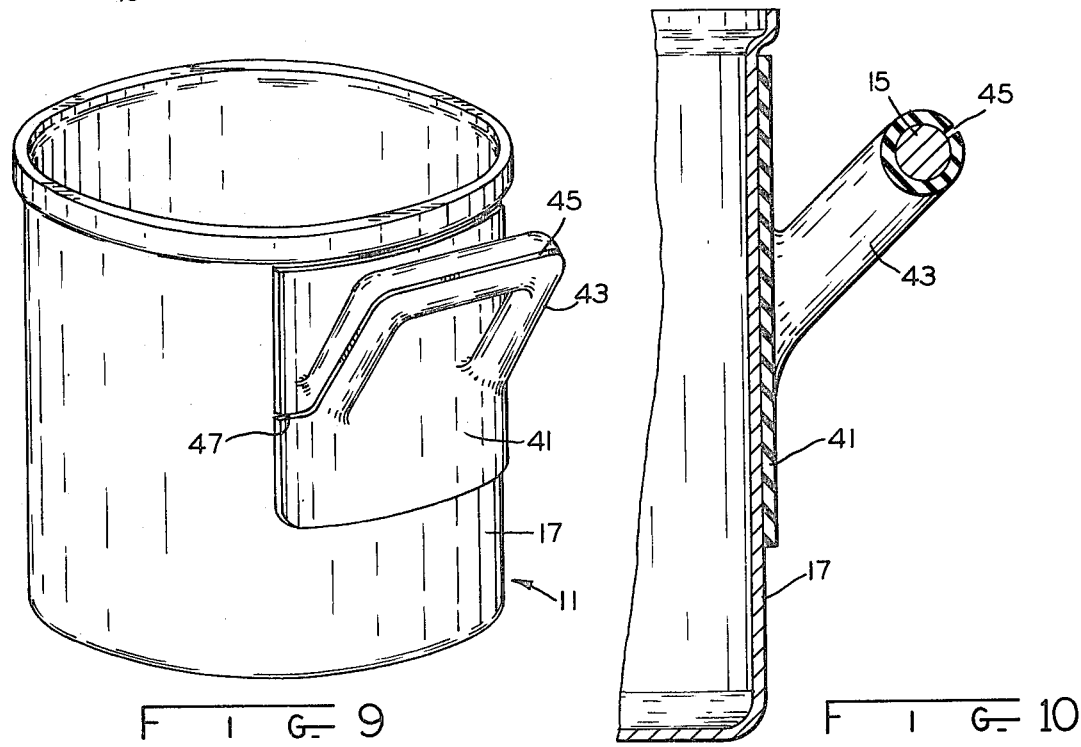
FIG. 9
FIG. 10

REMOVABLE COVERS FOR CLOSED LOOP UTENSIL HANDLES

BACKGROUND OF THE INVENTION

The present invention relates generally to insulated hand grips for cooking utensil handles and more particularly to replaceable hand grips made of a resilient rubber-like material of low thermal conductivity which may be easily placed and removed about closed loop utensil handles.

The problem of inadvertently grasping the hot handle of pots, pans and other cooking utensils has been with us for nearly as long as the art of cooking itself. In the domestic cooking environment where the use of cooking vessels is relatively infrequent and not for extended periods of time, the use of a common hotpad or oven mitt is a commonly employed solution, as is the forming of handles on the cooking vessels, with a molded plastic or wooden grip portion which grip portion is either molded or riveted to the handle with the handle in turn being typically welded or riveted to the vessel in question. Such fixed insulated grips are sometimes adequate for domestic cooking purposes but are frequently not adequate in the case of commercial cookware where frequent and prolonged use, as well as washing at high temperatures to sterilize the utensil, may cause the wooden or plastic handles to deteriorate rapidly and fail long before the remaining portion of the utensil is worn out. For this reason, commercial cookware is generally provided with a simple metal handle which is either riveted or welded to the main portion of the vessel.

For handles of the simple elongated variety, a satisfactory removable insulated handle is illustrated in U.S. Pat. No. 4,197,611, assigned to the assignee of the present invention. The solution embodied in this patent is not, however, satisfactory for handles of the closed loop variety as frequently found on opposing sides of larger cooking vessels, for example of the stockpot type. Similar closed loop handles are frequently encountered on lids for larger commercial cookware. The provision of an easily removable closed loop handle heat insulating cover would be highly desirable, particularly in the area of commercial cookware.

SUMMARY OF THE INVENTION

Among the several objects of the present invention may be noted the provision of an insulating handle cover to reduce the occurrence of burns during use of cooking utensils; the provision of a readily removable yet adequately protective insulated cover for utensil handles; the provision of a "ziplock" arrangement for closing the access slit in a tubular cover for a closed loop cooking utensil handle; and the provision of insulating covers for cooking utensil handles which remains securely in position during use but which are easily removable for cleaning the utensil as well as for replacement with new insulated handle covers. These as well as other objects and advantageous features of the present invention will be in part apparent and in part pointed out hereinafter.

In general, heat insulating covers for closed loop handles according to the present invention have a hollow tubular portion with an access slit to allow the tubular portion to be placed over a handle with the handle occupying the hollow tubular interior as well as a protective portion which is integral with the tubular portion and positioned against a utensil side wall intermediate the side wall and handle when the handle occupies the hollow tubular interior so as to provide a barrier preventing contact between a user's hand and the utensil side wall when the user grasps the handle occupied tubular portion.

Also in general and in one form of the invention, a removable heat insulating handle cover for use in conjunction with a cooking utensil having a closed loop handle comprises a hollow tubular hand grip of resilient rubber-like material of low thermal conductivity having an access slit along the entire length thereof to allow the grip to be placed over a closed loop handle so that the handle occupies the hollow tubular interior with the opposing slit surfaces being provided with a rib extending along one slit surface and a corresponding mateable groove extending along the other slit surface so that the rib and groove may be interlocked to maintain the slit closed when the handle cover is in position. The tubular hand grip may be provided with a series of lands and grooves extending therealong to provide a slip reducing surface for a user to grip.

BRIEF DESCRIPTION OF THE DRAWING

FIG. 1 is a perspective view of a stockpot type cooking utensil with one of the diametrically opposed closed loop handles having an insulating cover disposed thereon;

FIG. 2 is a view in section through the center of the utensil handle and cover of FIG. 1;

FIG. 3 is a top view of a portion of the utensil of FIG. 1 with the insulating handle in place;

FIG. 4 is a view of the insulating cover showing the side normally adjacent the utensil body and illustrating a modification to the tubular member slit;

FIG. 5 is a view in section through the tubular member illustrating in greater detail the modification of FIG. 4;

FIG. 6 is a view similar to FIG. 5 but illustrating the opposing slit surfaces unjoined;

FIG. 7 is a view along the line 7—7 of FIG. 3;

FIG. 8 is a view similar to FIG. 5 but illustrating the embodiment of FIGS. 1 through 3 which lacks the "ziplock" feature;

FIG. 9 is a view similar to FIG. 1 but illustrating a modification wherein the protective portion adjacent the utensil side wall is extended;

FIG. 10 is a view in section through the center of the utensil handle and cover of FIG. 9;

Corresponding reference characters indicate corresponding parts throughout the several views of the drawing.

Figure 11:
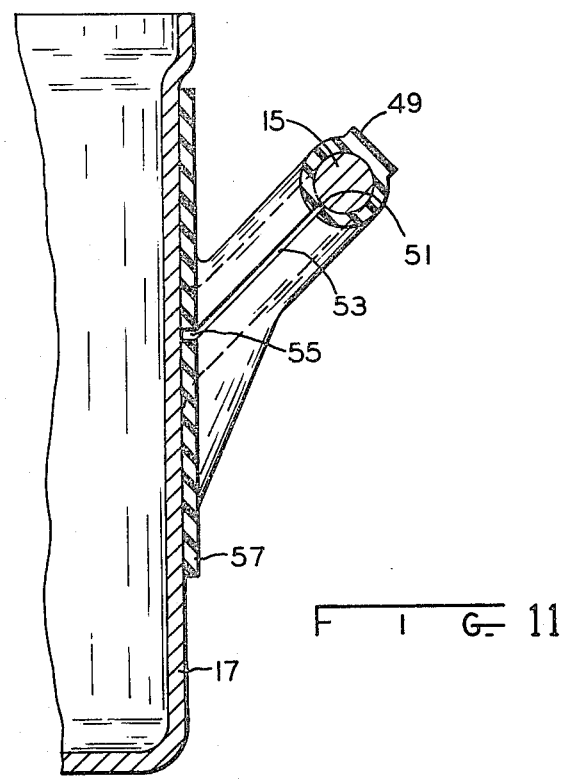
FIG. 11 is a view similar to FIG. 10 but illustrating a further modification of the cover.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

In FIG. 1, a stockpot type cooking utensil 11 of the type having a pair of closed loop handles on opposed side wall portions of the utensil is illustrated with one of a pair of removable heat insulating covers 13 for the visible handle illustrated. The closed loop handle 15 may be formed integral with the side wall or main body 17 of the utensil or may be fastened thereto by welding, riveting or other known cookware fabricating techniques.

Considering first the body of the heat insulating cover as illustrated in FIGS. 1, 2, 3, 7 and 8, this body is seen to include a hollow tubular hand grip 19 of resilient rubber-like material having a low thermal conductivity and having an access slit 21 extending along the entire length thereof to allow the grip to be placed over the closed loop handle 15 with the handle occupying the hollow tubular interior. The opposing slit surfaces, as best seen in FIGS. 2 and 8, remain juxtaposed due to the resilience of the cover material.

As best seen in FIGS. 1 and 3, the hollow tubular member 19 is generally U-shaped and extending between the U ends, there is a protective portion 23 which lies closely adjacent a portion of the main body of the utensil, such as side wall 17, intermediate the utensil handle 15, and the side wall 17, so as to provide a barrier which prevents a user's hand from contacting side wall 17 when grasping the hand grip portion of the cover. The hand grip portion of the hollow tubular member 19 is also provided with a plurality of ridges or lands 25 and corresponding grooves 27 extending therealong to provide a slip reducing surface for a user to grip. A series of ridges 29 and corresponding grooves 31 may also be provided on the surface of the protective portion 23 lying adjacent side wall 17 to further reduce heat transfer between side wall 17 and the surface of the protective portion 23, if desired.

A slight modification to the heat insulating cover, as discussed so far, is illustrated in FIGS. 4, 5 and 6, wherein the opposing slit surfaces 33 and 35 are provided with an arrangement for releasably joining those surfaces. This releasable joining arrangement includes a rib 39 extending along the slit surface 35 and a corresponding groove 37 extending along the slit surface 33 with rib 39 and groove 37 being deformably mateable to maintain the slit closed when the hand grip portion is in position, as illustrated in FIG. 5, surrounding the utensil handle 15. This rib and groove arrangement forms a "ziplock" junction between the slit surfaces. Thus, the cover is slipped over handle 15 so that the handle occupies the hollow tubular portion, as illustrated in FIG. 6, and thereafter the rib 39 forced into groove 37 to lock the slit surfaces together. This "ziplock" arrangement may extend entirely about the slit, as illustrated in FIGS. 4, 5 and 6, or may extend only about a portion of that slit, as desired.

Referring now to FIGS. 9 and 10, a further slight modification to the heat insulating cover so far discussed, and which may employ the simple slit principles of FIGS. 1, 2, 3, 7 and 8, or the "ziplock" feature of FIGS. 4, 5 and 6 is illustrated. The cover of FIGS. 9 and 10 differs slightly in that the protective portion 41 extends downwardly from the handle 15 to cover a greater portion of the surface area of side wall 17 and also extends outwardly beyond the U ends of tubular portion 43. To insure that the cover may be placed and removed about handle 15, the slit 45 extends outwardly from the U ends as at 47, while the other features of this cover remain as described earlier.

While the cover has been thus far described with the slit extending about an outer edge of the U shaped member 19 or 43 and extending beyond the protective portion, for example as illustrated at 47 in FIG. 9, to allow placement and removal of the cover about the closed loop handle 15, this placement and removal may also be accomplished by extending the slit about an inner edge of the U shaped member and continuing across the protective portion between the U ends, as illustrated in FIG. 11. Thus, in FIG. 11, the sleeve or tubular portion 49 is slit along the inner hand grip region, as at 51, and along the inner surface of the U legs, as at 53, as well as along the protective portion 57, between the two U ends, as illustrated at 55, so that the slit forms a closed loop. To place the cover of FIG. 11 over handle 15, the cover is simply stretched and handle 15 passed through the slit region 55 and along slit region 53, past slit region 51 to the position illustrated in FIG. 11. Removability of the cover may be accomplished in yet another way, as illustrated in FIGS. 12 and 13.

Figure 12:
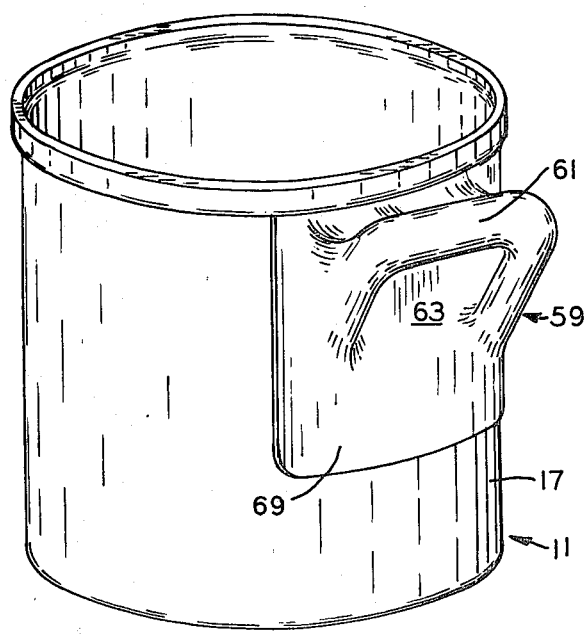
FIG. 12 is a view similar to FIGS. 1 and 9 but illustrating a still further modification of the cover.
Figure 13:
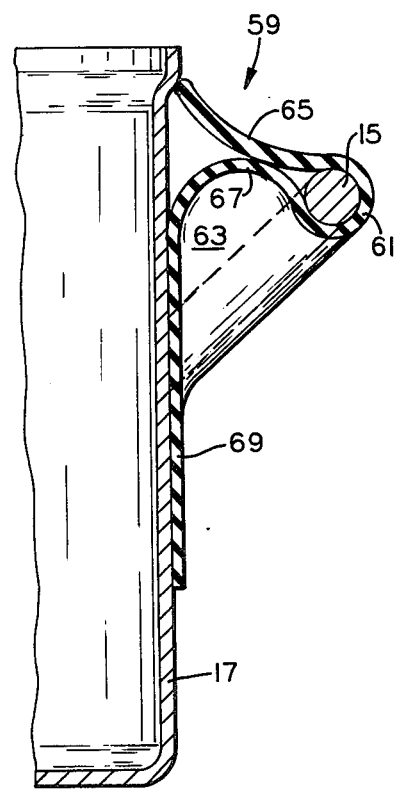
FIG. 13 is a view in section through the center of a portion of the utensil handle and cover of FIG. 12.

In FIGS. 12 and 13, the cover 59 is formed from a sheet of resilient material as before, but having a simply connected surface, and formed by continuous deformation of the sheet to form a bight section 61 for encircling the closed loop handle 15 and providing an upwardly deformed region 63 so as to not obstruct user access to the handle from the lower side thereof. The slit discussed earlier is now formed between the leg portions of bight 61, as at 65 and 67, with placement of the cover on a handle being accomplished by spreading those two leg portions apart and slipping the cover over the handle so that the bight 61 surrounds the handle 15 with the protective surface portion of the cover 69 lying adjacent side wall 17 of the utensil, as before.

In essence, the cover of FIGS. 12 and 13 is formed from a simply connected surface or flat sheet by continuous deformation without tearing or cutting that sheet while the cover illustrated in FIGS. 1 through 10 under continuous deformation would appear as a flat sheet with a hole through it, constituting a double connected surface, and such continuous deformation to the cover of FIG. 11 would result in a sheet with two separate holes therethrough, forming a triply connected surface.

The insulating covers disclosed herein may be formed of any resilient rubber-like material with a low thermal conductivity, and preferably one of the several silicone materials disclosed in the aforementioned 4,197,611 patent, which patent is incorporated herein by reference. Also, while the removable heat insulating cover of the present invention has been illustrated on a stockpot type cooking utensil having a pair of closed loop handles on opposed side wall portions thereof, the cover will fill utility in conjunction with a number of other cooking utensils. For example, closed U-shaped lid handles are frequently encountered on which any of the covers and especially the cover of FIGS. 9 and 10 might advantageously be used. The cover may be adapted to many handle configurations so long as the hand grip portion conforms generally to the handle shape, and the appropriate slit to allow the hand grip portion to be placed over and encircle that handle is provided. Typically, the barrier or protective portion will then lie intermediate the hand grip portion and a utensil surface to prevent the user's hand from contacting that utensil surface when grasping the hand grip portion.

From the foregoing it is now apparent that a novel insulating cover for a cooking utensil handle has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. A one-piece removable heat insulating cover for a cooking utensil handle comprising a body of resilient rubber-like material having low thermal conductivity having a U-shaped hollow hand grip portion for substantially surrounding the utensil handle and a protective flap portion joined to the U-shaped portion, said protective flap extending between the terminal ends of the U-shaped portion and laterally beyond at least one side of the U-shaped portion so as to be adapted to lie adjacent a portion of a main body of the utensil when the hand grip portion is positioned substantially surrounding the utensil handle with the protective flap portion providing a barrier to prevent a user's hand from contacting the utensil body when grasping the hand grip portion, the resiliency of the flap being such as to enable at least a portion of the flap adjacent the terminal ends of the U-shaped portion to follow the contour of the utensil body.

2. The cover of claim 1 wherein said hand grip portion is slit along an edge thereof from one U end to the other U end to facilitate placement and removal of the hand grip portion about the handle.

3. The cover of claim 2 wherein the hand grip portion includes, along opposing slit surfaces thereof, means for releasably joining the slit surfaces.

4. The cover of claim 3 wherein the means for releasably joining includes a rib extending along one slit surface and a corresponding groove extending along the other slit surface, the rib and groove being deformably mateable to maintain the slit closed when the hand grip portion is in position surrounding the utensil handle.

5. The cover of claim 2 wherein the slit extends about an inner edge of the U-shaped portion and continues across the protective portion between U ends to allow placement and removal of the cover about a closed loop handle.

6. The cover of claim 5 wherein the slit in conjunction with an opening through the handle loop divide the cover surface into a triply connected surface.

7. The cover of claim 2 wherein the slit extends about an outer edge of the U-shaped portion between U ends beyond the protective portion to allow placement and removal of the cover about a closed loop handle.

8. The cover of claim 7 wherein the slit in conjunction with an opening through the handle loop divide the cover surface into a doubly connected surface.

9. The cover of claim 1 formed from a sheet of resilient material having a simply connected surface by continuous deformation of the sheet to form a bight section for encircling a closed loop utensil handle without obstructing user access to the handle from the lower side thereof.

10. The cover of claim 1 wherein the hand grip portion is provided with a plurality of ridges and grooves forming a slip reducing surface for a user to grip.

* * * * *